US011188907B1

(12) United States Patent
Vijayvergia et al.

(10) Patent No.: US 11,188,907 B1
(45) Date of Patent: Nov. 30, 2021

(54) ACH AUTHORIZATION VALIDATION USING PUBLIC BLOCKCHAINS

(71) Applicant: United Services Automobile Association (USAA), San Antonio, TX (US)

(72) Inventors: Gunjan Vijayvergia, San Antonio, TX (US); Joseph Matthew Doddato, Boerne, TX (US); Dorothy Jean Bolt, San Antonio, TX (US); Michael L. Hertz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 694 days.

(21) Appl. No.: 15/243,500

(22) Filed: Aug. 22, 2016

Related U.S. Application Data

(60) Provisional application No. 62/208,164, filed on Aug. 21, 2015.

(51) Int. Cl.
*G06Q 20/40* (2012.01)
*G06Q 20/02* (2012.01)

(52) U.S. Cl.
CPC ......... *G06Q 20/401* (2013.01); *G06Q 20/023* (2013.01)

(58) Field of Classification Search
None
See application file for complete search history.

(56) References Cited

U.S. PATENT DOCUMENTS

| 2012/0076298 | A1* | 3/2012 | Bolotov | H04L 9/0631 380/255 |
| 2013/0124414 | A1* | 5/2013 | Roach | G06Q 20/10 705/44 |

(Continued)

FOREIGN PATENT DOCUMENTS

| AU | 2016101183 A4 | 9/2016 |
| CN | 105681301 A | 6/2016 |

(Continued)

OTHER PUBLICATIONS

BillPro, "What Merchants Need to Know About ACH Payments", Apr. 23, 2015, pp. 1-2 (Year: 2015).*

(Continued)

*Primary Examiner* — Neha Patel
*Assistant Examiner* — Gabriel Mercado
(74) *Attorney, Agent, or Firm* — Fletcher Yoder P.C.

(57) ABSTRACT

Methods, systems, and apparatus, including computer programs encoded on a computer storage medium, for obtaining a distributed blockchain encoding automated clearing house (ACH) authorization data associated with one or more prior transactions to provide a local copy of the distributed blockchain, receiving ACH authorization data associated with a first transaction, validating the ACH authorization data associated with the first transaction to obtain validation information corresponding to the first ACH authorization data associated with the first transaction, updating the local copy of the distributed blockchain with the validation information, and broadcasting the validation information to multiple nodes.

15 Claims, 9 Drawing Sheets

(56) References Cited

U.S. PATENT DOCUMENTS

| | | | |
|---|---|---|---|
| 2015/0186888 A1* | 7/2015 | Katz | G06Q 40/12 |
| | | | 705/39 |
| 2015/0269570 A1* | 9/2015 | Phan | G06Q 20/382 |
| | | | 705/71 |
| 2015/0332395 A1 | 11/2015 | Walker et al. | |
| 2015/0363770 A1 | 12/2015 | Ronca et al. | |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0363786 A1* | 12/2015 | Kolupaev | G06K 9/34 |
| | | | 705/44 |
| 2015/0379510 A1 | 12/2015 | Smith | |
| 2016/0203477 A1 | 7/2016 | Yang et al. | |
| 2016/0224977 A1 | 8/2016 | Sabba et al. | |
| 2016/0234026 A1 | 8/2016 | Wilkins et al. | |
| 2016/0253663 A1 | 9/2016 | Clark et al. | |
| 2016/0260169 A1 | 9/2016 | Arnold et al. | |
| 2016/0267605 A1* | 9/2016 | Lingham | G06Q 40/12 |
| 2016/0321751 A1 | 11/2016 | Creighton, IV et al. | |
| 2016/0321752 A1 | 11/2016 | Tabacco et al. | |
| 2016/0328713 A1 | 11/2016 | Ebrahimi | |
| 2016/0342978 A1 | 11/2016 | Davis et al. | |
| 2016/0342989 A1 | 11/2016 | Davis | |
| 2016/0371680 A1* | 12/2016 | Miles | G06Q 20/3276 |
| 2017/0053249 A1 | 2/2017 | Tunnell et al. | |
| 2017/0076280 A1 | 3/2017 | Castinado et al. | |
| 2017/0076286 A1 | 3/2017 | Castinado et al. | |
| 2017/0078299 A1 | 3/2017 | Castinado et al. | |
| 2017/0091397 A1 | 3/2017 | Shah | |
| 2017/0103391 A1 | 4/2017 | Wilson, Jr. et al. | |
| 2017/0109748 A1 | 4/2017 | Kote | |
| 2017/0132625 A1 | 5/2017 | Kennedy | |
| 2017/0132626 A1 | 5/2017 | Kennedy | |
| 2017/0132630 A1* | 5/2017 | Castinado | G06Q 20/4014 |
| 2017/0140145 A1 | 5/2017 | Shah | |
| 2017/0140375 A1 | 5/2017 | Kunstel | |
| 2017/0178237 A1 | 6/2017 | Wong | |
| 2017/0228704 A1 | 8/2017 | Zhou et al. | |
| 2017/0230353 A1 | 8/2017 | Kurian et al. | |
| 2017/0230375 A1 | 8/2017 | Kurian | |
| 2017/0236121 A1 | 8/2017 | Lyons et al. | |
| 2017/0243025 A1 | 8/2017 | Kurian et al. | |
| 2017/0243177 A1 | 8/2017 | Johnsrud et al. | |
| 2017/0243208 A1 | 8/2017 | Kurian et al. | |
| 2017/0243209 A1 | 8/2017 | Johnsrud et al. | |
| 2017/0243212 A1 | 8/2017 | Castinado et al. | |
| 2017/0243286 A1 | 8/2017 | Castinado et al. | |
| 2017/0244707 A1 | 8/2017 | Johnsrud et al. | |
| 2017/0244757 A1 | 8/2017 | Castinado et al. | |
| 2017/0270527 A1 | 9/2017 | Rampton | |
| 2017/0286951 A1 | 10/2017 | Ignatchenko et al. | |
| 2017/0287068 A1 | 10/2017 | Nugent | |
| 2017/0300877 A1* | 10/2017 | Mann | H04L 9/3239 |
| 2018/0205555 A1* | 7/2018 | Watanabe | H04L 9/3247 |
| 2018/0225611 A1* | 8/2018 | Daniel | G06F 16/27 |
| 2019/0122300 A1* | 4/2019 | O'Brien | G07F 17/3286 |

FOREIGN PATENT DOCUMENTS

| | | | | |
|---|---|---|---|---|
| CN | 106204287 A | 12/2016 | | |
| CN | 106408299 A | 2/2017 | | |
| CN | 106506493 A | 3/2017 | | |
| CN | 106600401 A | 4/2017 | | |
| CN | 106611372 A | 5/2017 | | |
| CN | 106682528 A | 5/2017 | | |
| KR | 20160150278 A | 12/2016 | | |
| KR | 101701131 B1 | 2/2017 | | |
| KR | 20170040079 A | 4/2017 | | |
| KR | 101762245 B1 | 7/2017 | | |
| WO | WO-2016015041 A1 * | 1/2016 | | H04L 9/3297 |
| WO | 2016175914 A2 | 11/2016 | | |
| WO | 2017022917 A1 | 2/2017 | | |
| WO | 2017027900 A1 | 2/2017 | | |
| WO | 2017066002 A1 | 4/2017 | | |
| WO | 2017091530 A1 | 6/2017 | | |
| WO | 2017136956 A1 | 8/2017 | | |
| WO | 2017139688 A1 | 8/2017 | | |
| WO | 2017146333 A1 | 8/2017 | | |

OTHER PUBLICATIONS

BillPro, What Merchants Need to Know About ACH payments (Year: 2015).*

Rizzo ("Paydici Launches Recurring Bitcoin Billing for Small Merchants", at least p. 3) (Year: 2014).*

'wikipedia.com' [online], "Proof-of-stake," Nov. 2016, [retrieved on Dec. 2, 2016], Retrieved from the Internet: URL<https://en.wikipedia.org/wiki/Proof-of-stake>. 4 pages.

'wikipedia.com' [online] "Blockchain (database)," Dec. 2016, [retrieved on Dec. 2, 2016] Retrieved from the Internet: URL<https://en.wikipedia.org/wiki/Blockchain_(database)>. 12 pages.

* cited by examiner

ACH AUTHORIZATION VALIDATION USING PUBLIC BLOCKCHAINS

CROSS-REFERENCE TO RELATED APPLICATIONS

This application claims priority to U.S. Application Ser. No. 62/208,164, filed on Aug. 21, 2015, the entire contents of which is incorporated herein.

BACKGROUND

Increasingly, commerce is conducted electronically. The Automated Clearing House (ACH) network supports the electronic movement of money and payment-related data. In some examples, the ACH network provides a safe, secure, electronic network for direct consumer, business, and government payments, annually facilitating billions of ACH-based transactions (e.g., debit transactions, direct deposit transactions).

Disputes regarding ACH transactions between entities (e.g., a bank disputing payment to a commercial enterprise on behalf of a customer) is a manual and slow process. For example, ACH disputes can include the receiving entity (e.g., a bank) sending a request to an originating entity (e.g., a commercial enterprise) for a copy of the original authorization of the disputed transaction to prove the transaction was properly authorized by the customer. Inefficiencies abound in this dispute resolution process due to, for example, each entity holding their own authorization data in a private manner, requiring manual communication between institutions.

SUMMARY

Implementations of the present disclosure are generally directed to validating Automated Clearing House (ACH) authorizations using blockchains. More particularly, implementations of the present disclosure are directed to retrieving secure ACH authorization data from a blockchain, in which there is a high level of confidence that the blockchain has not been tampered with, to confirm whether a transaction was authorized. In accordance with implementations of the present disclosure, an entity (e.g., a commercial enterprise) can externally publish ACH authorization data in a secure manner, enabling other entities (e.g., a bank) access to ACH authorization data associated with their accounts at any time, in a self-service manner. That is, implementations of the present disclosure enable an entity requiring ACH authorization data to access the ACH authorization data at any time in a self-service type transaction (e.g., without requesting the ACH authorization data from the commercial enterprise).

In general, innovative aspects of the subject matter described in this specification can be embodied in methods that include actions of: obtaining, by at least one processor, a distributed blockchain encoding automated clearing house (ACH) authorization data associated with one or more prior transactions to provide a local copy of the distributed blockchain; receiving, by the at least one processor, ACH authorization data associated with a first transaction, the ACH authorization data associated with the first transaction having been broadcast to multiple nodes from a first computing device; validating, by the at least one processor, the ACH authorization data associated with the first transaction to obtain validation information corresponding to the first ACH authorization data associated with the first transaction; updating the local copy of the distributed blockchain with the validation information; and broadcasting the validation information to the multiple nodes Other implementations of this aspect include corresponding systems, apparatus, and computer programs, configured to perform the actions of the methods, encoded on computer storage devices.

These and other implementations can each optionally include one or more of the following features. For example, in some implementations, obtaining the distributed blockchain includes obtaining, from at least one node, a copy of the distributed blockchain.

In some implementations, obtaining the distributed blockchain includes encoding, by the processor, at least a portion of the authorization data associated with at least one prior transactions into the distributed blockchain.

In some implementations, the ACH authorization data associated with the first transaction includes at least one of the account holder name, the routing/transit number of the account, a time stamp of when the transaction occurred, a time stamp of when the account was generated, and a time stamp of when the authorization was captured.

In some implementations, the ACH authorization data associated with the first transaction is encrypted.

In some implementations, validating the ACH authorization data associated with the first transaction includes generating a digest value corresponding to the ACH authorization data associated with the first transaction, and applying a proof of work protocol to the digest value to obtain a proof of work value that satisfies a predefined requirement of the proof of work protocol. Generating the digest value can include, for example, applying a hash function to the ACH authorization data associated with the first transaction and one or more blocks of the local blockchain.

These and other implementations can include one or more of the following advantages. For example, in some implementations, using a public blockchain allows secure authorization data to be openly broadcast, so that a retrieving party can access the authorization data in a self-service type transaction (e.g., without requesting the secure data from the entity with which the authorization data originates). Furthermore, the use of multiple nodes to maintain and validate the authorization data can enhance the integrity of the data being stored. For instance, tampering with a single node or a handful of nodes may render those nodes invalid for updating the blockchain. Additionally, with each additional transaction added to the blockchain, the computational effort and difficulty to tamper with the blockchain value may increase. These features therefore provide the blockchain with a high level of immutability, such that an entity can be confident the data has not been altered during the time between publication and retrieval.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
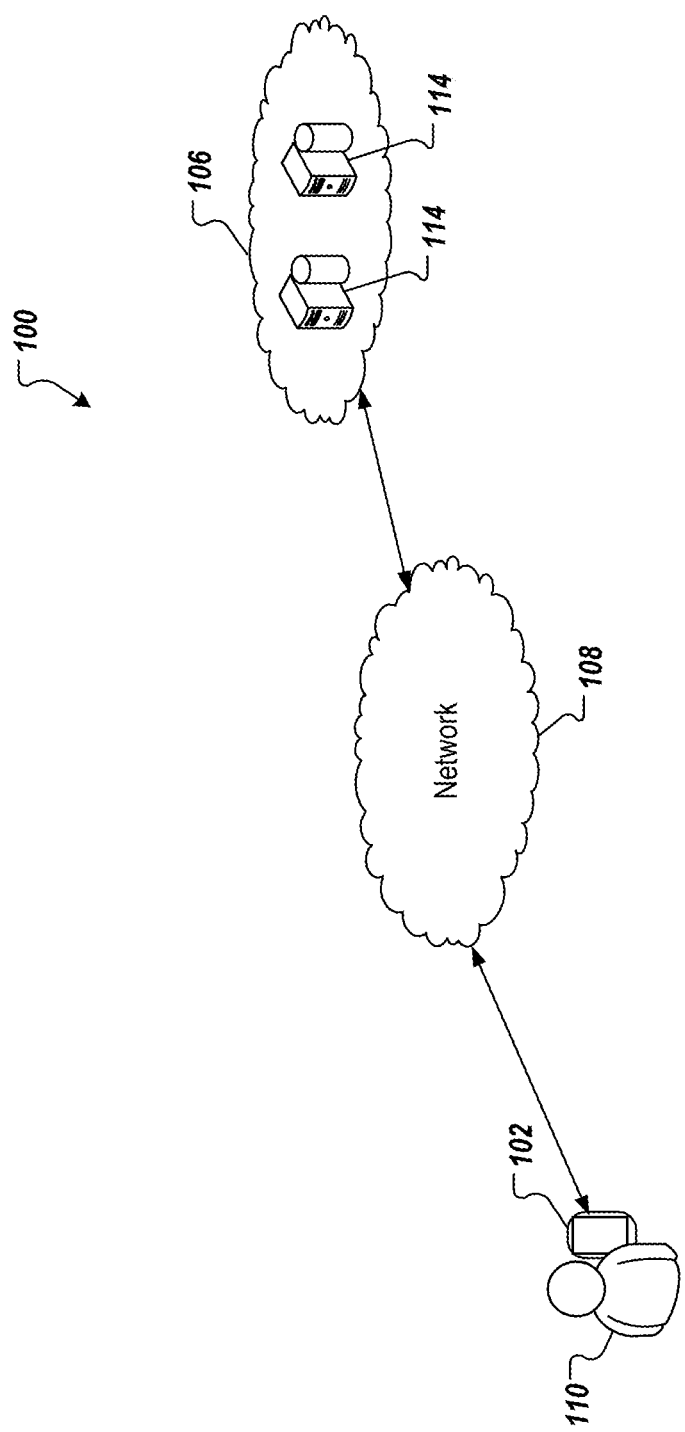
FIG. 1 depicts an example environment in accordance with implementations of the present disclosure.

Implementations of the present disclosure are generally directed to validating Automated Clearing House (ACH) authorizations using blockchains. More particularly, implementations of the present disclosure are directed to retrieving secure ACH authorization data from a blockchain, in which there is a high level of confidence that the blockchain has not been tampered with, to confirm whether a transaction was authorized. In accordance with implementations of the present disclosure, an entity (e.g., a commercial enterprise) can externally publish ACH authorization data in a secure manner, enabling other entities (e.g., a bank) access to ACH authorization data associated with their accounts at any time, in a self-service manner. That is, implementations of the present disclosure enable an entity requiring ACH authorization data to access the ACH authorization data at any time in a self-service type transaction (e.g., without requesting the ACH authorization data from the commercial enterprise).

In general, according to certain implementations of the disclosure, each participating institution is provided with public/private key pairs for encrypting ACH authorization data. Thus, when published to a blockchain, the authorization data can be made public but still secured. For example, if one participating institution (e.g., a bank) originates an ACH debit to be pulled from a second participating institution (e.g., a different bank), the authorization information may be published by the first bank to a public blockchain, but encrypted using a combination of the first bank's private key and the second bank's public key. This would allow the content to be public but only viewable by the 2 institutions that need to know. Thus, the sometimes slow process for validating transactions could be substantially improved.

Implementations of the present disclosure will be described in further detail with reference to an example context. The example context includes an ACH debit transaction, in which a customer electronically pays a receiver (e.g., a commercial enterprise) a sum of money by debiting an account (e.g., savings account, banking account) that the customer has with a financial institution (e.g., bank, credit union) and then publishing authorization data associated with that transaction to a blockchain. It is contemplated, however, that implementations of the present disclosure can be realized in any appropriate context. For example, the transaction may include an exchange of goods, property, or currency other than an ACH debit transaction. The transaction may include an exchange of promises, such as an agreement. The transaction may include a legal agreement that is self-executing, such as a smart contract. In some implementations, the data published to the blockchain may include data other than ACH authorization data. For example, the data published to the blockchain may include data specifying identities of the parties involved in the transaction or the details of the transaction such as: the goods, services, and/or property being exchanged; contractual terms and conditions binding the parties involved in the transaction; warranties covering the transaction; certain remedies or compensation that may cover certain breaches of the agreement underlying the transaction. In some implementations, one or more of the parties to the transaction can be an entity other than a bank. For example, in some implementations, the transaction may be between a customer and a $3^{rd}$ party, such as a biller payment provider, having authorization to access the customer's financial account (e.g., credit account, checking account, or other financial account). In general, implementations of the present disclosure can be realized in any appropriate ACH transaction, in which transaction information is to be validated.

FIG. 1 depicts an example environment 100, in which implementations of the present disclosure can be provided. The example environment 100 enables a user 110 to conduct an ACH debit transaction to electronically pay a sum of money to a receiving entity (e.g., a first financial institution) using funds from a second entity (e.g., a second financial institution). For instance, a user 110 may wish to make a payment towards a loan, a credit card balance, a mortgage, an insurance premium, or some other product or service held or offered by the first financial institution using funds in an account from the second different financial institution. Alternatively, or in addition, the user 110 may wish to transfer funds from an account at the second financial institution to a different financial account (e.g., a savings account or a checking account) at the first financial institution. Other types of fund transactions between the institutions are also possible.

In some implementations, the user 110 may conduct the debit transaction by using device 102 to submit an electronic request to perform the debit transaction to the first financial institution 106. For example, in some implementations, the first financial institution 106 may host a website through which user 110 can access one or more services or products offered by the first financial institution 106. The website may allow the user 110 to arrange for payment for the one or more services or products using funds from an account held at the second financial institution. For instance, the user 110 may specify in the request the account and institution from which the funds should be drawn, as well as the specific amount of funds to use for the transaction. When the user 110 confirms payment to the first financial institution 106, the electronic request may be sent electronically from the device 102 through a network (e.g., the Internet) 108 to one or more server devices 114 operated by the first financial institution 106. Upon receiving the electronic request, the first financial institution 106 may, e.g., process the requested transaction and then send a debit request to the second financial institution for to receive the funds specified in the transaction. The first financial institution 106 may then notify the user 110 that the transaction has been processed by, e.g., providing a confirmation reply message to the user 110 (e.g., through text message or email) and/or by updating the status of the transaction on the website being accessed by the user 110.

Traditionally, transactions between financial institutions, such as the debit request described with respect to FIG. 1, are conducted using a trusted third party or clearing house. An Automated Clearing House (ACH) is a computer-based clearing and settlement facility established to process the exchange of electronic transactions among participating financial institutions. Commercial entities increasingly use ACH online to have customers pay for products or services, rather than via credit or debit cards. Rules and regulations that govern the ACH network are established by the National Automated Clearing House Association (NACHA) and the Federal Reserve.

Figure 2A:
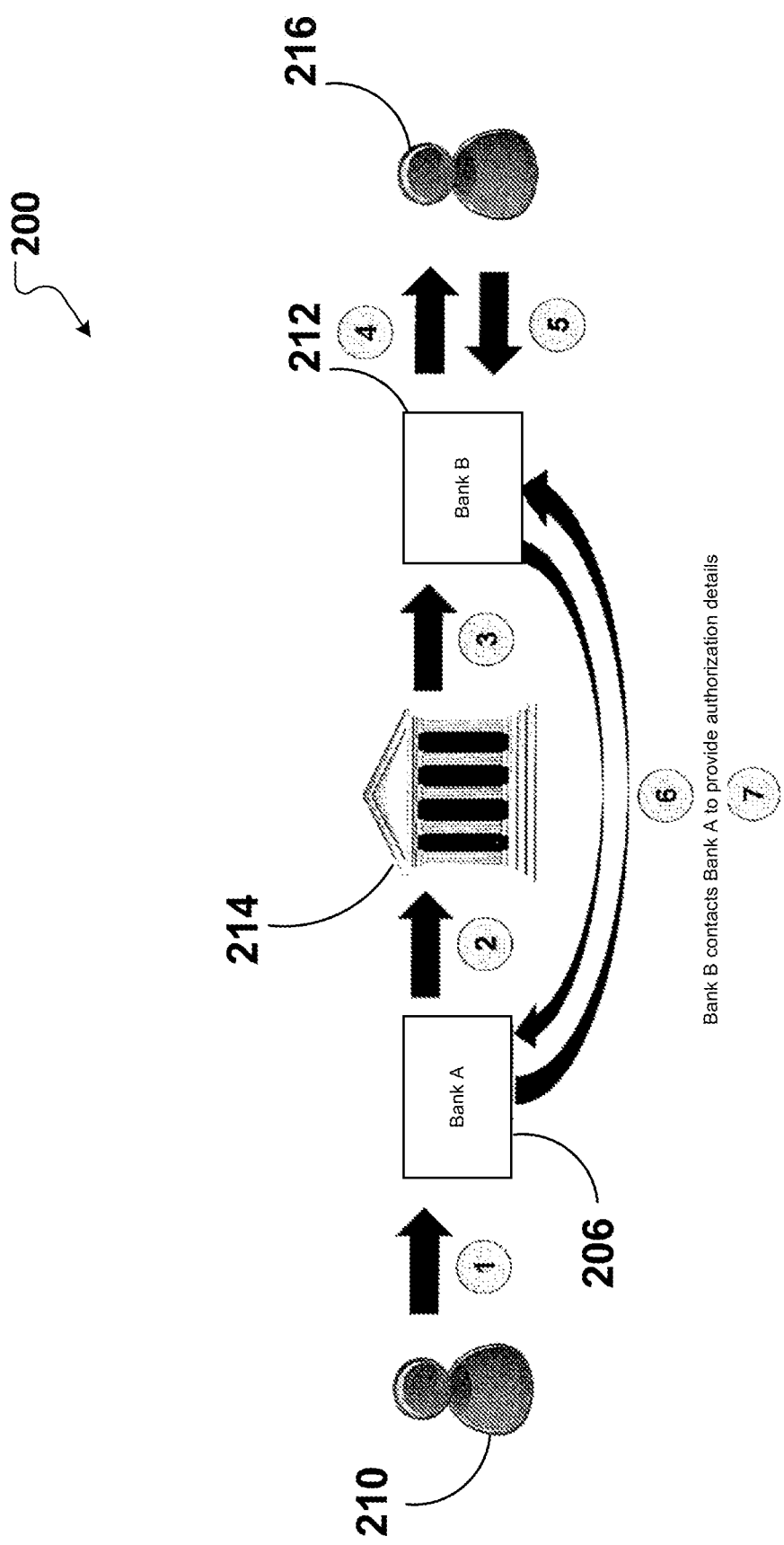
FIG. 2A depicts an example Automated Clearing House (ACH) transaction.

FIG. 2A depicts an example ACH transaction 200. The ACH transaction 200 may proceed following, e.g., a debit or credit request initiated by a customer, such as the debit request in the example of FIG. 1. For instance, as shown in FIG. 2A, a customer 210 (1) logs onto a website hosted by a first financial institution 206 and initiates an ACH debit transaction from a second financial institution 212 with which the customer 210 currently holds a financial account (e.g., a savings account, a checking account). The first financial institution 206 (2) processes the transaction and sends the ACH debit through the ACH network via a clearing house 214. The clearing house 214 (3) sends the ACH debit to the second financial institution 212 and settles the transfer of funds between the entities. The second financial institution (4) processes the debit transaction and debits the customer's account that is held by the second financial institution 212.

In some implementations, customer 210 is not the actual holder of the account at the second financial institution 212 from which funds are debited. For example, the customer 210 may be another user attempting to commit a fraudulent transaction of which the actual holder 216 of the account is unaware. The true holder 216 of the account may become aware of the fraudulent debit transaction, and subsequently dispute (5) the transaction (e.g., request that the funds credited back to the true holder's account). Scenarios other than fraud are also possible where a customer may dispute a transaction (e.g., a commercial enterprise fails to render a product or service). The second financial institution 212 then, on behalf of the true account holder 216, may seek a refund of the money transferred to the first financial institution 206. In some implementations, the request for the refund is not made until beyond a specified cutoff point (i.e., a fixed number of days set by NACHA from the initial transaction). In those instances, the second financial institution 212 must (6) contact the first financial institution 206 to request the specific authorization details to prove the transaction was properly authorized by the customer 216. The first institution 206 then (7) collects the transaction information and provides the authorization details to the second institution 212. If the details do not match, the money is refunded. Otherwise, the transaction is authorized.

Such disputes regarding ACH transactions between entities (e.g., a bank disputing payment to a commercial enterprise on behalf of a customer) are typically manual and slow processes. For example, inefficiencies abound in this dispute resolution process due to, for example, each entity holding their own authorization data in a private manner, requiring manual communication between institutions.

Figure 2B:
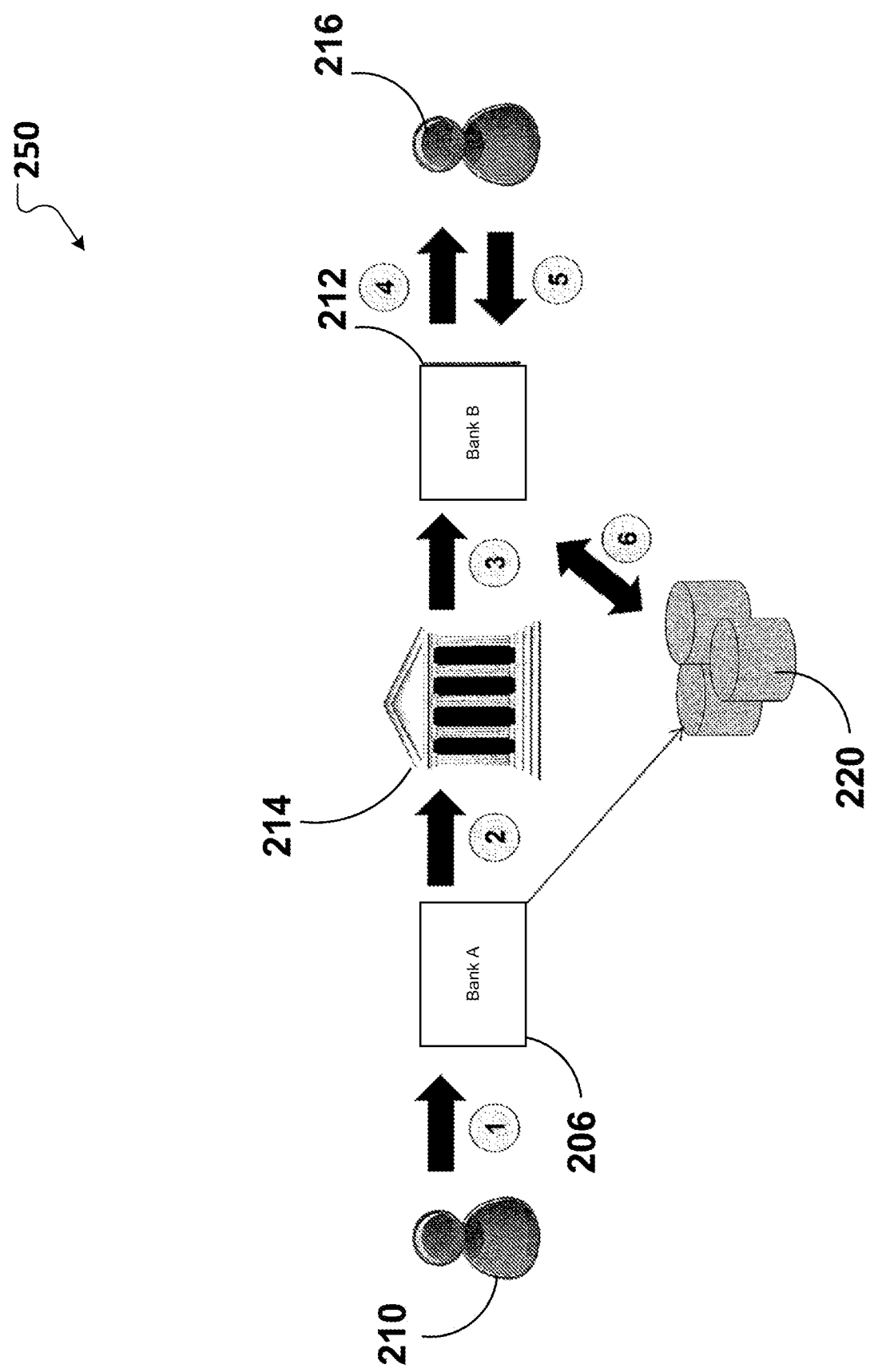
FIG. 2B depicts an ACH transaction in accordance with implementations of the present disclosure.

FIG. 2B depicts an example ACH transaction 250 in accordance with implementations of the present disclosure. As in the example of FIG. 2A, a financial transaction between entities (e.g., a debit transaction) may be processed, after which a true account holder 216 disputes the authorization of the transaction. However, instead of validating authorization of a financial transaction through a third party and/or through a slow manual process of submitting requests and waiting for authorization details, authorization information in ACH transaction 250 is made available using blockchains 220. More particularly, secure ACH authorization data pertaining to one or more financial transactions (e.g., authorization data encrypted by the first financial institution) are published by the first financial institution 206 to the blockchain 220. When a dispute is raised by an account holder 216 at the second financial institution 212, the second financial institution 212 then (6) retrieves the secure authorization data for the disputed transaction from the blockchain 220 (and decrypts the encrypted data) to confirm whether a transaction was authorized. Because the authorization data has been published to the blockchain 220, the second financial entity can rely on the retrieved authorization data with a high level of confidence that the data has not been tampered with. The publication of ACH authorization data to the blockchain 220 therefore enables, in some implementations, entities such as the financial institution 212, to access to the data associated with their accounts at any time, in a secure self-service manner (e.g., without requesting the ACH authorization data from the entity with which the transaction originated).

In certain implementations, a blockchain may be understood as including a distributed data store that maintains a continuously growing list of data records that are hardened against tampering and revision. For instance, with respect to the example of FIG. 2B, the blockchain 220 may actually be stored across a network of "nodes" (e.g., a processor and associated memory), in which each node retains a list, also known as a "ledger," of financial transactions that have been published to the blockchain 220 by an entity, such as the financial institutions 206, 212. Each node gets a copy of the blockchain 220 and validates authorization data as it is received, after which the data may be relayed to other nodes within the network. Because of the distributed nature of the blockchain, various advantages are possible. For example, the use of multiple nodes to maintain and validate the authorization data can, in some implementations, enhance the integrity of the data being stored. In some implementations, tampering with a single node or a handful of nodes renders those nodes invalid for updating the blockchain. Additionally, with each additional transaction added to the blockchain, the computational effort and difficulty to tamper with the blockchain value may increase. These features therefore provide the blockchain with a high level of immutability, such that an entity can be confident the data has not been altered during the time between publication and retrieval.

Figure 3A:
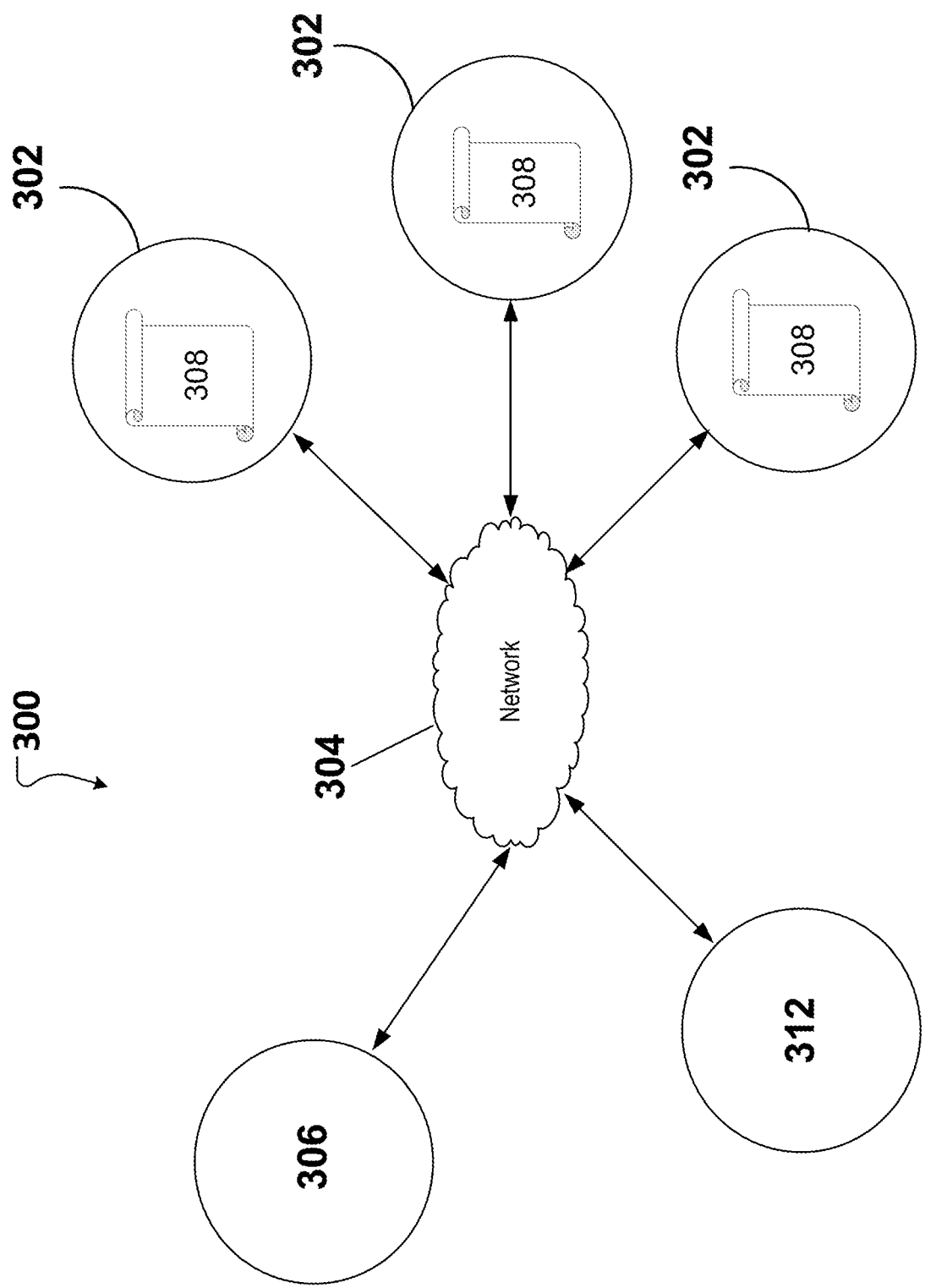
FIG. 3A depicts an example environment, in which implementations of the present disclosure can be provided.

FIG. 3A depicts an example environment 300, in which implementations of the present disclosure can be provided. The example environment 300 includes a first entity 306 (e.g., a commercial enterprise such as a first financial institution), one or more second entities 312 (e.g., a second commercial enterprise such as a second financial institution) and multiple nodes 302, each of which is connected to a network 304 (e.g., the Internet). More particularly, each of the first entity 306 and the second entity 312 may be operating a computing device and/or a server system that execute one or more computer programs and that are communicatively coupled to the network 304. Similarly, the nodes 302 may include one or more computing devices and/or server that execute one or more computer programs and that are communicatively coupled to the network 304. Furthermore, the nodes 302 may be operated by the same or different entities. For instance, each node 302 may be operated by a different financial institution. In some implementations, one or both of financial institutions 306, 312 operate one or more nodes.

In a particular implementation, the first financial institution 306 processes a transaction initiated by a customer, similar to the transaction processed in the example of FIG. 1, in which the second financial institution 312 is the counterpart from which funds may be debited or credited. As part of processing the transaction, the first financial institution 306 may also collect data related to the authorization of the transaction. This authorization data can include, for example, the account holder name, the routing/transit number of the account, a time stamp of when the transaction occurred, a time stamp of when the account was generated, a time stamp of when the authorization was captured, one or more legal agreements to which the customer agreed to when conducting the transaction, among other information that is relevant for confirming authorization of a transaction.

Once collected, the authorization data is encrypted and digitally signed by the first financial institution. For example, in some implementations, the financial institution 306 may encrypt the authorization data using (1) a private key from a public-private key pair associated with the first financial institution 306 and (2) a public key from a public-private key pair associated with the second financial institution 312. Using the combination of the first financial institution public key and the second financial institution private key serves to both encrypt the data and sign the encrypted data with a digital signature. Thereafter, the message can be decrypted with (3) a public key from the public-private key pair associated with the first financial institution 306 and (2) a private key from the public-private key pair associated with the second financial institution 312. Other encryption techniques may be used instead, so long as the counterparty intended to retrieve the authorization data has the ability to perform decryption and access the relevant data.

The encrypted authorization data may also be appended to include indexing information or a trace number so that the second financial institution can determine whether it is the intended recipient of the authorization data and the transaction to which the encrypted authorization data corresponds. In certain implementations, the trace number is encrypted with the authorization data such that trace number is viewable only if the obtaining part can perform decryption (e.g., only if the party holds the correct private key). In some implementations, the trace information includes a number specifying the sending institution's routing number and/or a transaction identifier. In some implementations, a portion or all of the trace number can be read without requiring decryption. In such cases, the portion or all of the trace number does not contain private information and can therefore be used to index the transaction in the blockchain, so that the second institution can identify the authorization data to access.

The encrypted authorization data then is broadcast by the first financial institution 306 through the network 304 to the nodes 302. The authorization data is received by the various nodes 302, validated, and then recorded in the node's copy of the public distributed ledger 308, also called the blockchain. A node 302 that has validated authorization data may also broadcast the information added to its own ledger to other nodes 302. The goal of the nodes 302 is to collate the transaction authorization data into a single global block, i.e., the blockchain. In a simplified analogy, each "entry" in the ledger 308 corresponds to the authorization data for a particular transaction conducted by the first financial institution, whereas a "page" in the ledger corresponds to a group of validated authorization data, i.e., a block of the blockchain.

In a particular implementation, the blockchain is generated by the node 302 by applying a hash function to the collection of received encrypted authorization data until a single digest value is created. The single digest value or "transaction block" encodes the entirety of the transactions received by the node 302 until that point. If the node 302 had received one or more previous transaction blocks, then those previous blocks are incorporated into the new transaction block.

Figure 4:
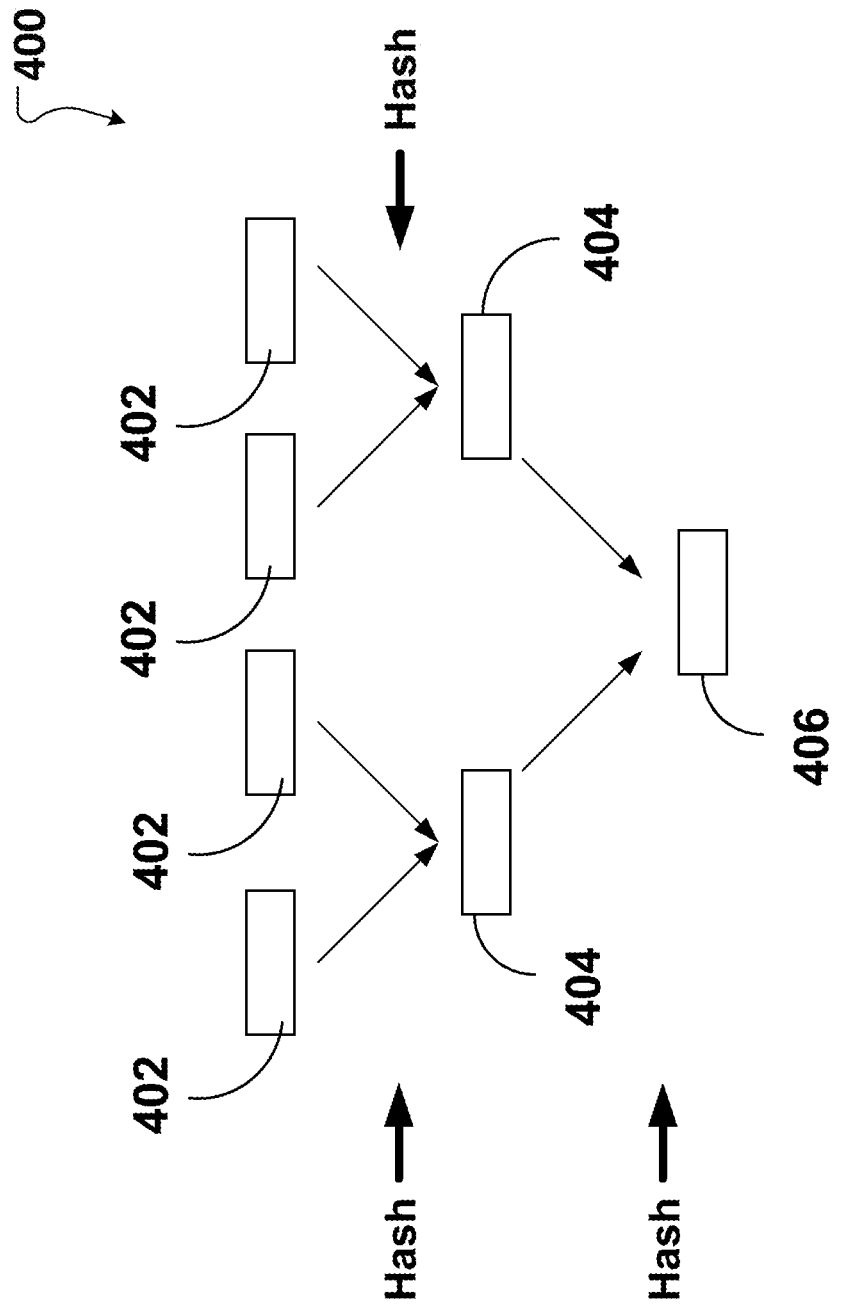
FIG. 4 depicts an example process for forming a block of a blockchain.

For example, FIG. 4 depicts an example process 400 for forming a digest value, or block, of a blockchain. As shown in FIG. 4, a node, such as node 302 in FIG. 3A, may receive a series of authorization data 402, each of which contains encrypted authorization information about a particular transaction. Pairs of authorization data 402 are hashed together by the node (i.e., the authorization data 402 is provided as an input to a hash function) to produce hashed values 404, which in turn may be hashed together to produce a final digest value 406. If the node had previously received one or more other transaction blocks, then those blocks may be incorporated (hashed) into the digest value 406. Various different hash functions may be used to produce the digest value 406. For example, the hash may include an MD5 hash or a SHA-256 hash. Other cryptographic hash functions can be used as well.

Referring back to FIG. 3A, since the blockchain is a distributed database, in order to independently verify the chain of ownership of any and every authorization, each network node 302 stores its own copy of the blockchain. Upon receiving the authorization data, each node 302 works to validate the data. When a first node has validated the data, the validated information then is incorporated into that node's ledger 308 and broadcast to the other nodes 302 on the network for incorporation into their ledgers. Generally, once a node has validated the data and broadcast the validated information to the other nodes, those nodes will cease their own validation efforts and incorporate the new validation information into their copies of the blockchain.

The process of validation by a node entails producing a so-called "proof of work." Generally, a proof of work may be understood to include a piece of data that was difficult (e.g., requiring substantial processing power and/or time) to produce so as to satisfy a specified set of requirements (e.g., a pre-fix to data in which the prefix contains a predefined number of zeros), and is also trivial to check whether data satisfies requirements.

For instance, the validation may employ a proof of work protocol referred to as "hashcash," which is commonly associated with the bitcoin blockchain. Other proof of work protocols may be used instead. In an example proof of work process, a node 302 will take the digest value generated by hashing the authorization data and create a challenge number and the node 302 must then identify the proof of work number that, when input into a cryptographic hash with the challenge number meets the predefined requirements (e.g., the data prefix containing the desired number of zeros). The proof of work number may be identified, e.g., by an iterative process in which the node 302 attempts to combine different numbers with the challenge number until the predefined requirements are met. Once the proof of work is found by a node 302, the node 302 publishes this information along with the block to the other nodes 302. If the other nodes 302 have not finished their proof of work for that authorization data, those nodes 302 incorporate and continue to build their blockchains from the newly received block.

An advantage of the proof of work is that it is easy to check whether the authorization data has been tampered with. For instance, a node 302 can apply the same cryptographic hash function to the proof of work and the challenge value generated from the hashed authorization data and check whether the output meets the predefined requirements (e.g., the data prefix containing the desired number of zeros). If the requirements are met, the data may be presumed valid, otherwise the data may be discarded.

Although FIG. 3A depicts a single financial institution that broadcasts encrypted authorization data for financial transactions to the ledgers 308, additional entities (e.g., other financial institutions) also may broadcast encrypted authorization data that correspond to transactions with which those institutions have been involved. In an example, each entity may correspond to a different bank. For each bank, the bank will encrypt authorization data relating to transactions involving the transfer of money to and/or from that bank, and then send the encrypted and signed authorization data to the ledgers 308 of the different nodes 302. The nodes 302 receive, validate, and add the encrypted information to their blockchains as described herein. The encrypted and signed authorization data sent by the banks may include identification/trace data that allows a retrieving entity to identify and retrieve the authorization data in which they are interested.

Figure 3B:
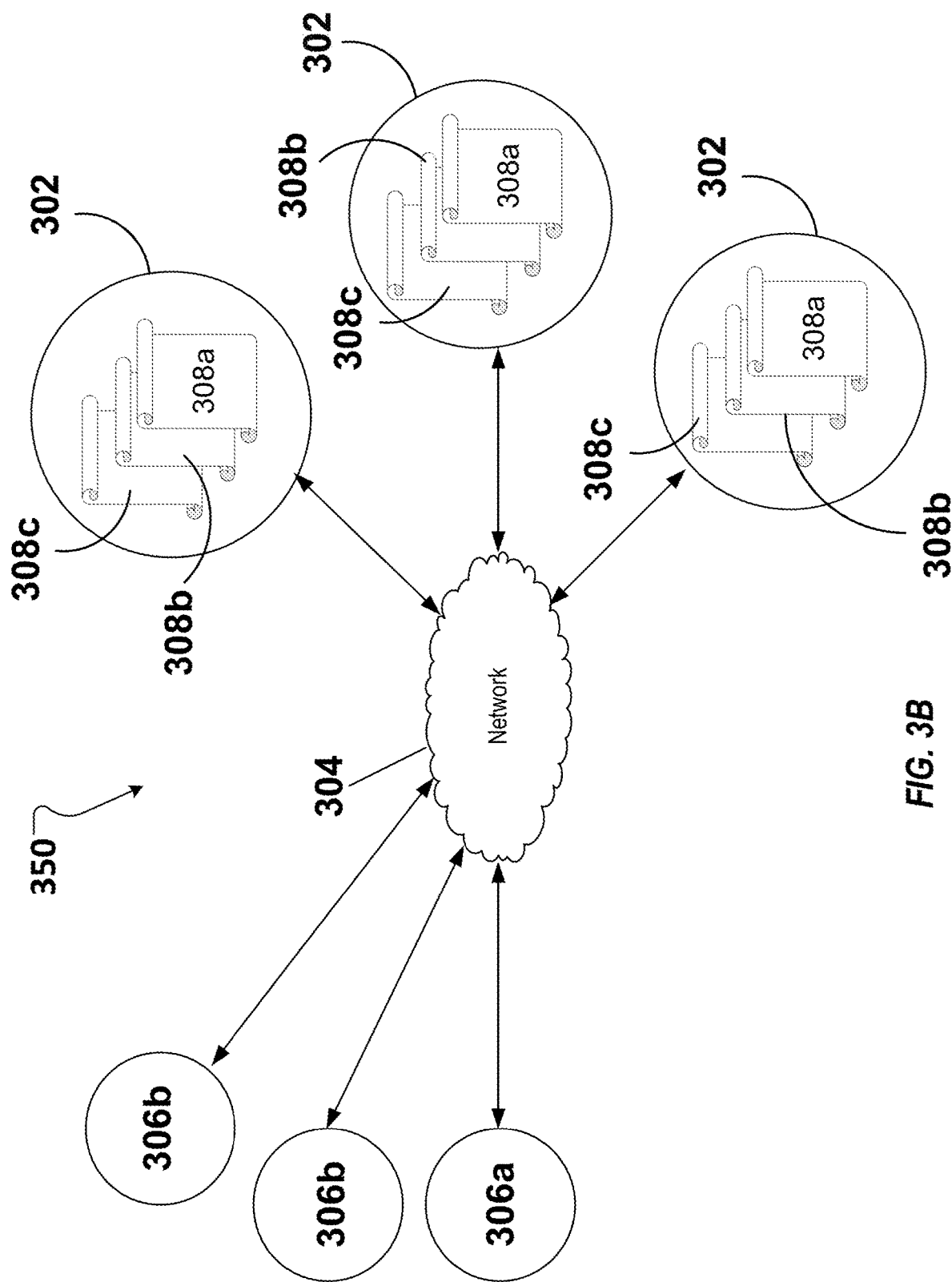
FIG. 3B depicts an example environment, in which implementations of the present disclosure can be provided.

In some implementations, the nodes 302 store multiple ledgers, in which each ledger stores authorization data for a particular entity. For instance, FIG. 3B depicts an example environment 350, in which implementations of the present disclosure can be provided. The example environment 350 is identical to environment 300, with the exception that additional financial institutions (306a, 306b, 306c) broadcast encrypted authorization data to the nodes 302, and that each of the nodes 302 includes multiple ledgers (308a, 308b, 308c). For ease of viewing, the one or more financial institutions that are the counterparts in the financial transactions from which funds may be debited or credited are omitted from FIG. 3B.

Each ledger (308a, 308b, 308c) stores in a blockchain the authorization data for a different financial institution. For example, ledger 308a may store authorization data encrypted by a first financial institution, ledger 308b may store authorization data encrypted by a second financial institution, ledger 308c may store authorization data encrypted by a third financial institution. Alternatively, the different ledgers 308 may be organized by counterparty in the financial transaction such as the financial institution 212 in FIG. 2B from which funds are debited or to which funds are credited. For example, ledger 308a may store authorization data only for financial transactions in which a first financial institution is one of the counterparties to the financial transaction, ledger 308b may store authorization data only for financial transactions in which a second financial institution is one of the counterparties to the financial transaction, and ledger 308c may store authorization data only for financial transactions in which a third financial institution is one of the counterparties to the financial transaction.

As noted herein, an advantage of using a public blockchain, such as the blockchains associated with FIGS. 3A-3B, is that secure authorization data may be openly broadcast, allowing a retrieving party to access the authorization data in a self-service type transaction (e.g., without requesting the ACH authorization data from the entity with which the authorization data originates) with high confidence that the data has not been altered since publication.

To retrieve the secure authorization data, a retrieving party may, in some implementations, obtain a copy of the ledger and search the ledger for the authorization data associated with the desired transaction. For example, referring again to FIG. 3A, the second financial institution 312 may be notified by a customer about a potentially fraudulent transaction. In response to the notification of the potentially fraudulent transaction associated with the customer's account, the second financial institution will access the most current ledger available 308 on the nodes 302 and search for authorization data corresponding to the transaction identified by the customer.

In certain implementations, the second financial institution 312 may download a copy of the current ledger from one or more of the nodes 302. The authorization data stored in the ledger 308 may be indexed using information related to the transaction with which the data is associated, thus allowing the second financial institution to search and identify the relevant authorization data. For example, in certain implementations, the trace number associated with the authorization data may also be used to index the authorization data. In some implementations, the second financial institution 312 may employ an application module that enables searching of the blockchain for the desired transaction authorization data.

Figure 5A:
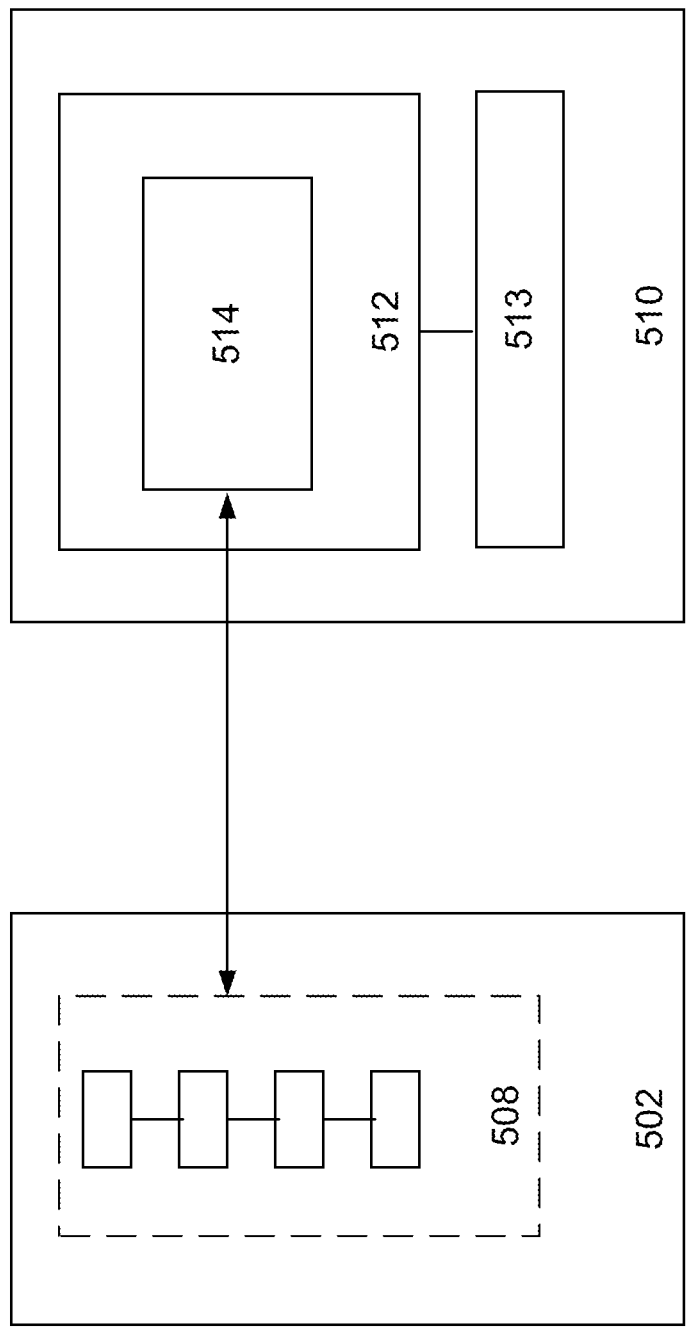
FIG. 5A is a schematic that illustrates an example device operable to communicate with a node hosting a blockchain.

For example, FIG. 5A is a schematic that illustrates an example device 510 that may be operated by the second financial institution 312 in FIG. 3A and which communicates with a node 502 hosting a blockchain. The device 510 may be a computing device that includes a processor 512 and corresponding memory 513. The processor 512 may be configured to execute computer-program product code (stored, e.g., on memory 513) that implements access module 514. Using access module 514, the second financial institution 312 may communicate with one or more nodes 502 that host a blockchain 508 containing the secure authorization data. The access module 514 allows the device 510 to download a copy of the blockchain 508 from node 502 and search the blockchain 508 for the desired authorization data. The access module 514 may implement on the device 510 an interactive user interface that can be output to a display and through which a user can enter search parameters and view authorization data retrieved from a blockchain. For example, in some implementations, a user employing access module 514 may enter into the user interface a search query containing data relevant to a particular transaction (e.g., date of transaction, customer name, account number, amount of funds involved in the transaction). Alternatively, instead of using specific information related to the particular transaction, the user can enter into the search query unique index information that corresponds to the transaction. For instance, the first financial institution and second financial institution may have an agreed upon indexing system in which a unique index value (e.g., alphanumeric code) is generated for each transaction. The access module 514 searches the blockchain for the relevant information and, if corresponding authorization data is found, the authorization data is returned to the user (e.g., output to the display through the access module user interface, stored in memory or transmitted to another device).

Once the secure authorization data has been retrieved by the access module 514, the access module 514 or other application module operating on the device 510 may decrypt the encrypted authorization data. For instance, if the authorization data has been encrypted with the first financial institution's private key and the second financial institution's public key, the data may be decrypted with the second financial institution's private key and the first financial institution's public key. With the decrypted authorization data, the second financial institution 312 then can check the data against its own records to determine whether the transaction was fraudulent.

Though the access module 514 described above is associated with a computing device 510 used by the second financial institution, the access module may be used by any node or entity connected to the network to access the blockchain, publish data to the blockchain, and/or download a copy of the blockchain. Moreover, the access module 514 may be used to validate the blockchain by checking the proof of work associated with the digest value obtained from the blockchain, as described herein.

Figure 5B:
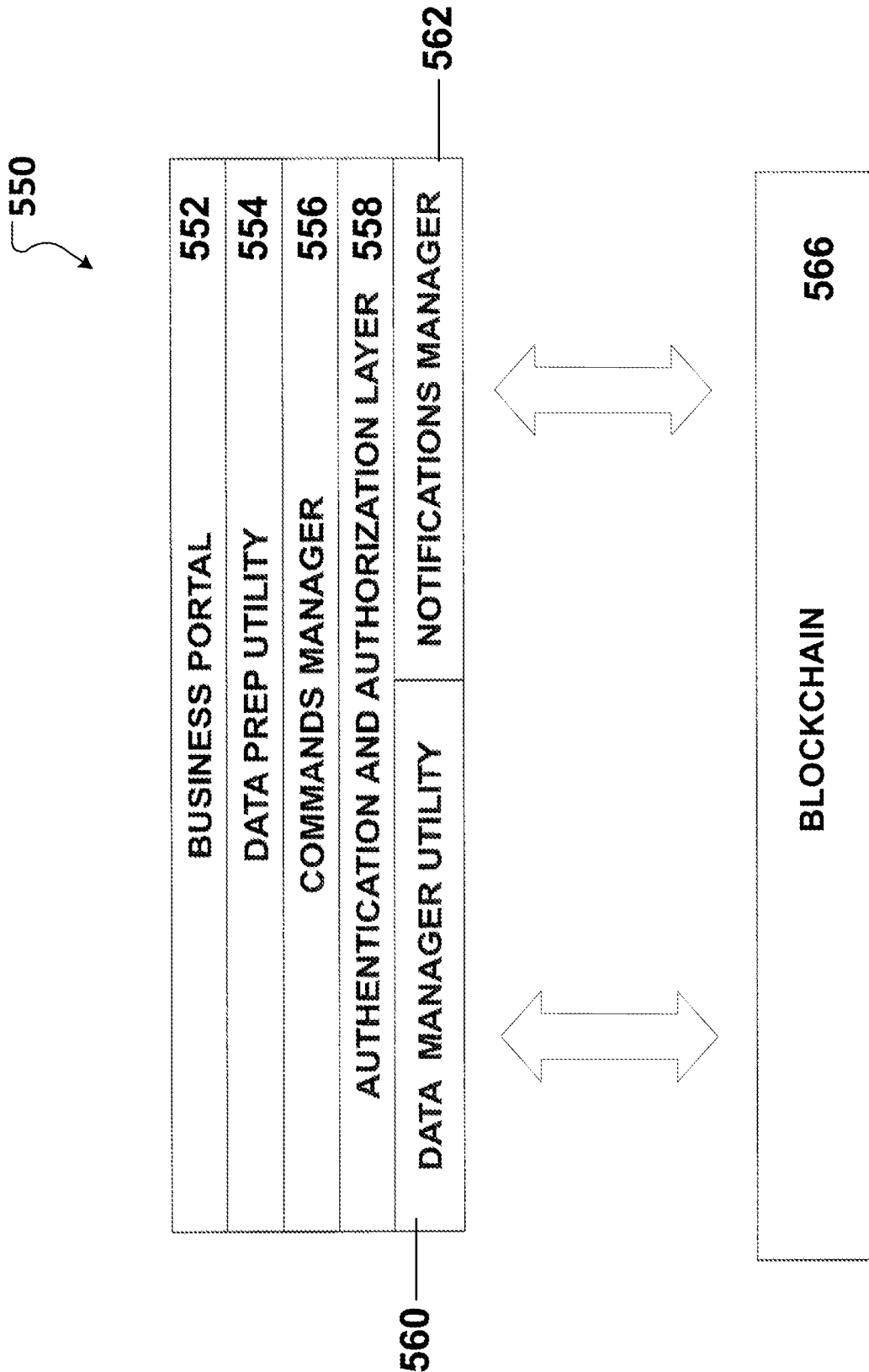
FIG. 5B is a schematic that depicts an application layer of an blockchain access module.

FIG. 5B depicts application layer 550 corresponding to the access module 514. The application layer 550 includes a business portal sub-layer 552, a data preparation utility sub-layer 554, a commands manager sub-layer 556, an authentication and authorization sub-layer 558, a data manager utility 560 and a notifications manager 562. Each of the sub-layers of the application layer 550 may be implemented in digital electronic circuitry, or in computer software, firmware, or hardware, including the structures disclosed in this specification and their structural equivalents, or in combinations of one or more of them. For example, the application layer and its sub-layers may be realized using one or more computer programs, i.e., one or more modules of computer program instructions, encoded on computer storage medium for execution by, or to control the operation of, data processing apparatus.

In general, the application layer 550 of the access module 514 enables an entity to publish data to a blockchain 566 as well as access data on the blockchain 566. The general process for placing data on the blockchain 566 and accessing the data will now be described.

An entity (e.g., entity A) wishing to utilize the access module 514 to publish data to a desired blockchain 566 authenticates itself to the application layer 550 through the authentication and authorization layer 558. The application layer 550 then may access the blockchain to which the entity has access rights. For instance, the application layer may utilize the data manager utility 560 to download the blockchain from a remote node hosting the blockchain or from a local memory store. The data preparation utility sub-layer 554 prepares a data packet containing the data to be published. For instance, the data packet may include ACH authorization data selected or identified by the business portal sub-layer 552. As described herein, the creation of the data packet may entail encrypting and digitally signing the authorization data with a public-private key combination. The data preparation utility sub-layer 554 may also assign access rights to the data. For instance, if the creating entity (entity A) wishes one or more different entities (e.g., entities B and C) to have access to the data, it may assign access rights to those entities. Access rights may include, e.g., viewing the data (e.g., allowing an entity to decrypt and view the data), updating the data, and/or deleting the data. The data preparation utility sub-layer 554 may also assign a unique identification number for the data, to enable indexing of the data. Once the data packet has been generated, the commands manager sub-layer 556 creates a command to insert the encrypted data packet into the blockchain 566. Responsive to the insert command, data manager utility 560 proceeds to insert the data into the blockchain 566.

The application layer 550 may also enable notifications when data has been added to the blockchain 566. For instance, after entity A publishes data to blockchain 566, entities B and C, which may be running their own application layers 550, will receive a notification from notifications manager 562 that new data has been inserted into blockchain 566. The entity receiving the notification (e.g., entity B and/or C) then issues a command through commands manager sub-layer 556 to retrieve the new items from the blockchain 566. In some implementations, the authentication and authorization sub-layer may require the receiving entity to authenticate itself in the same manner as the publishing entity (e.g. entity A) has done. Once authenticated, the receiving entity then can pull from the blockchain 566, using data manager utility 560, a copy of the data to which it has been assigned access rights. To ensure the pulled data packet is readable/editable by the receiving entity, the authentication and authorization sub-layer 558 may inspect the data packet to confirm the assignment of access rights.

Upon receiving the data packet from the blockchain 566, the data preparation utility manager 554 of the application layer 550 contacts the publishing entity (e.g., entity A) with the receiving entity's (e.g., entity B) token that is generated from a private key. The publishing entity (e.g., entity A) receives a request and validates the request with the receiving entity's (e.g., entity B) public key. The publishing entity (e.g., entity A) then returns the full content of the data packet back to the receiving entity (e.g., entity B) and the business portal 552 expands the data packet for viewing on an interactive display.

The application layer 550 may enable additional features as well. For example, in some implementations, the application layer 550 may allow authorization data to be marked for deletion, in which deletion entails adding a new data block that adds the same data with a new state. In some implementations, authorization data may be updated, by adding a new data block that adds, e.g., modified data with an updated state, time-stamp and/or new version number for the authorization data. In some implementations, the application layer 550 also enables audit history of authorization data to be retrieved based on the unique identification number associated with the authorization data. The audit history then allows an entity to review the modifications that have been made to the authorization data.

Figure 6:
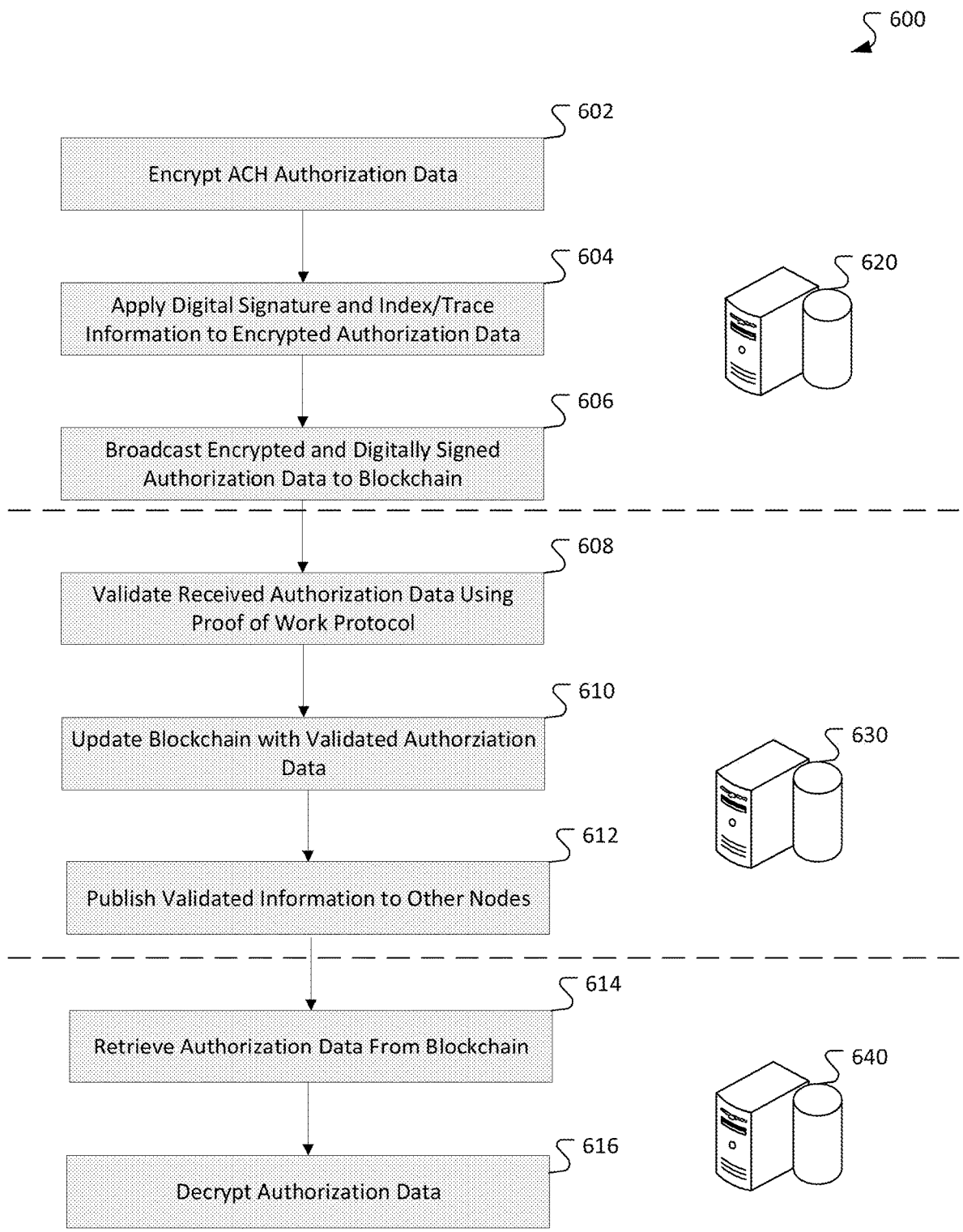
FIG. 6 depicts an example process that can be executed in accordance with implementations of the present disclosure.

FIG. 6 depicts an example process 600 that can be executed in accordance with implementations of the present disclosure. The example process 600 can be implemented, for example, by the example environment 300, 350 of FIGS. 3A-3B. In some examples, the example process 600 can be provided by one or more computer-executable programs executed using one or more computing devices. For example, the example process 600, or portions thereof, can be provided by one or more programs executed on a computing device and/or a server system. In a particular implementation, actions 602 through 606 may be implemented by one or more programs executed server system 620 that is operated by a first entity (e.g., a commercial entity, financial institution or other entity). Actions 608 through 612 may be implemented by one or more programs executed on server system 630 that is operated by second entity. Actions 614 through 616 may be implemented by one or more programs executed server system 640 that is operated by third entity (e.g., financial institution desiring to confirm transaction authorization).

The process 600 includes encrypting (602) ACH authorization data associated with a first transaction. As explained herein ACH authorization data can include the account holder name, the routing/transit number of the account, the date and time of the first transaction, among other information that is relevant for confirming authorization of the first transaction. Encrypting the ACH authorization data may include, for example, encrypting the data with a private key from a public-private key pair associated with the first entity and a public key from a public-private key pair associated with the third entity.

The process 600 further includes applying (604) a digital signature and index/trace information to the encrypted ACH authorization data associated with the first transaction. As explained herein, the index/trace information may include, for example, a unique value (e.g., alpha-numeric value) generated using a naming convention that is agreed upon by the first and third entity and that enables the first and third entity to identify the corresponding transaction to which the authorization data belongs. In certain implementations, the index/trace number is encrypted and appended to the authorization data such that trace number is viewable only if the obtaining party can perform decryption (e.g., only if the party holds the correct private key). In some implementations, the index/trace information includes data (e.g., number and/or phrase) that is specific to and that identifies the first entity and/or the third entity, such as a routing number. In some implementations, the index/trace information includes data (e.g., number and/or phrase) that is specific to and that identifies the transaction to which the authorization data belongs (e.g., time and date of transaction, location at which the transaction took place, the type of transaction (e.g., deposit, withdrawal, transfer of funds). In some implementations, a portion or all of the index/trace number can be read without requiring decryption. In such cases, the portion or all of the index/trace number does not contain private information and can therefore be used to index the transaction in the blockchain, so that the second institution can identify the authorization data to access. In some implementations, the index/trace information may be hashed and appended to the authorization data. In some implementations, the index/trace information includes multiple identifiers for the transaction that are hashed. When an entity needs to retrieve the authorization data, the entity can use the index/trace information to identify the authorization data within the block chain. For instance, the entity seeking to retrieve the authorization data can perform a hash of its own data associated with the transaction to identify a match of the hashed index/trace information included in the blockchain. Upon locating a match, the corresponding authorization data associated with the hashed index/trace information in the blockchain is identified as the authorization data to be retrieved.

The process 600 further includes broadcasting (606) the encrypted and digitally signed ACH authorization data associated with the first transaction to a distributed blockchain hosted by multiple nodes across a network. Such broadcasting can include, for example, electronically transmitting the encrypted and digitally signed ACH authorization data to one or more server systems 630 from server system 620.

The process 600 further includes receiving and validating (608) the encrypted and digitally signed ACH authorization data by the one or more server systems 630. Validation of the ACH authorization data may include applying a proof of work protocol to the authorization data to obtain a challenge value and proof of work value that together meet specified requirements of the proof of work protocol. For example, a hash function may be applied to the received authentication data associated with the first transaction and prior authorization data associated with one or more prior transactions to provide a digest value. Using the digest value, a challenge value may be generated for which the one or more server systems 630 operate to identify a proof of work value that, when combined with the challenge value (e.g., by applying both the challenge and proof of work values as an input to a hash function) provide a predefined requirement of the proof of work protocol (e.g., a number having a data prefix containing a desired number of zeros).

The process 600 further includes updating (610) the blockchain with the validated ACH authorization data. For example, the one or more server systems 630 may update a previously obtained blockchain to include the new digest value obtained by hashing the received ACH authorization data with previously received blocks. The previously obtained blockchain may have been obtained by accessing copies from other nodes in the network. For example, in some implementations, the one or more server systems 630 includes an access module (e.g., access module 514) that access a publicly distributed blockchain that is available on one or more other nodes in a network. Alternatively, the previously obtained blockchain may be been generated by the one or more server systems 630 based on previously received ACH authorization data associated with other transactions. For example, in some implementations, the one or more server systems 630 may apply a hash function to previously received ACH authorization data to generate the blockchain.

The process 600 further includes publishing (612) the proof of work and updated blockchain to other nodes on the distributed network. For example, publishing (612) may include electronically transmitting the proof of work and new blockchain to other nodes. Upon receiving the proof of work and new blockchain, the receiving nodes then update their blockchains with the new values.

The process 600 further includes retrieving (614) the authorization data from the distributed blockchain. For example, the one or more server systems 640 may implement an access module (e.g., access module 514) that access the publicly available blockchains on the nodes and download a copy of the blockchain. The access module may provide an interactive user interface through which a user may enter search parameters to identify the ACH authorization data corresponding to a desired transaction. For example, the user may enter details associated with a particular transaction, such as the identifier of the other financial institution associated with the transaction, the time and date of the transaction, the customer associated with the transaction, among other identifiers. The one or more identifiers entered by the user then may be compared, by, e.g., the access module 514, against the index/trace information associated with the different entries to the blockchain to identify a match. Upon identifying a match, the authorization data corresponding to the index/trace identifier is retrieved, e.g., by the access module 514. In some implementations, the search parameters entered in the user interface are hashed, e.g., by the access module 514. The hashed value or values then are compared, e.g., by access module 514, against hashed index/trace information to identify a match. Again, upon identifying a match, the authorization data corresponding to the index/trace identifier is retrieved, e.g., by the access module 514.

The process 600 further includes decrypting (616) the retrieved ACH authorization data. For example, the data may be decrypted with the third entity's private key and the first entity's public key.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. For example, the transaction between entities may include a self-executing transaction instead of an ACH debit or credit transaction. For instance, if entity 1 delivers a good to entity 2, an automatic payment may be initiated from entity 2 to entity 1. In another example, if entity 2 fails to make payment to entity 1, then the access to a good provided by entity 1 to entity 2 may be cut off. In the example of these self-executing transactions, the transaction data 4 published to the blockchain may include methods of verifying that certain obligations and/or conditions occurred. For example, entities 1 and 2 may specify that a parcel service tracking number be used to confirm that a good was delivered and/or use a bank wire transfer confirmation to verify payment.

Furthermore, as explained herein, one or more of the parties to a transaction can be an entity other than a bank. For example, in some implementations of the subject matter described herein, the transaction may be between a customer and a 3rd party having authorization to access the customer's financial account. Examples of $3^{rd}$ parties provided with authorization to access the customer's account include, but are not limited to, individuals, online payment systems (e.g., Paypal, Amazon Payments, Google Wallet, etc.), merchants of services and/or goods, whether the merchant enables the transaction online or at a so-called "brick-and-mortar" institution, among others. The $3^{rd}$ party, such as the online payment system or merchant, may have their own set of public/private keys for encrypting/decrypting the transaction information. The type of access that the $3^{rd}$ parties may be authorized to have include, e.g., the authority to debit and/or credit the customer's account or to simply obtain status information (e.g., account value) regarding the customer's account. The customer's account may include, e.g., a checking account, a credit account, a money market account, a retirement account, among others.

Additionally, other types of blockchains may be used for publishing authorization data other than the blockchains described herein. For example, Ethereum blockchains, which operate on the underlying network unit Ether, may be used instead. Entities may use their own blockchains as well.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:

receiving, by the at least one processor, transaction dispute data relating to a first automated clearing house (ACH) transaction, wherein the transaction dispute data indicates that an entity disputes authorization of the first ACH transaction;

requesting from a node of a plurality of nodes of a distributed blockchain, by the at least one processor, a plurality of blocks of the distributed blockchain comprising a plurality of automated clearing house (ACH) authorization data associated with one or more prior transactions to obtain a local copy of the distributed blockchain to initiate a dispute resolution process based on the transaction dispute data, wherein the request is based on the first ACH transaction and wherein the one or more prior transactions comprise the first ACH transaction;

retrieving, by the at least one processor, first ACH authorization data associated with the first ACH transaction from the plurality of blocks of the distributed blockchain, wherein the first ACH authorization data was broadcast to the plurality of nodes of the distributed blockchain from a first computing device, wherein the first ACH authorization data associated with the first ACH transaction is encrypted based on a public-private key pair comprising a private key associated with the first computing device and a public key associated with a second computing device, and wherein the first ACH authorization data associated with the first ACH transaction includes a digital signature and index/trace information associated with the first ACH transaction;

validating, by the at least one processor, the first ACH authorization data to generate validation information by generating a digest value corresponding to the first ACH authorization data, generating a challenge value using the digest value corresponding to the first ACH authorization data, applying a proof of work protocol to the digest value to obtain a proof of work value using the challenge value, and combining the challenge value with the proof of work value to provide a predefined requirement of the proof of work protocol, wherein the proof of work value satisfies the predefined requirement of the proof of work protocol, wherein generating the digest value comprises applying a hash function to the first ACH authorization data and one or more blocks of the local blockchain;

verifying, by the at least one processor, the first ACH transaction based on the validation information from the first ACH authorization data to provide an authentication of the first ACH transaction;

after the validation of the first ACH transaction, updating the local copy of the distributed blockchain with the validation information; and after the validation of the first ACH transaction, broadcasting the validation information to the plurality of nodes.

2. The method of claim 1, wherein requesting the plurality of blocks of the distributed blockchain comprises obtaining a copy of the distributed blockchain.

3. The method of claim 1, wherein requesting the plurality of blocks of the distributed blockchain comprises requesting one or more prior transactions broadcast to the distributed blockchain by the first computing device.

4. The method of claim 1, wherein the index/trace information included in the first ACH authorization data comprises one or more of an account holder name, a routing/transit number of an account, a time stamp of when the first ACH transaction occurred, a time stamp of when the account was generated, and a time stamp of when the authorization data was generated.

5. The method of claim 1, wherein the recited method steps are performed using multitasking or parallel processing.

6. A system comprising:

a computer-readable data storage device; and at least one processor configured to interact with the computer-readable data storage device, the at least one processor being further configured to execute computer-readable instructions to perform operations comprising:

receiving, by the at least one processor, a transaction dispute relating to a first transaction, wherein the transaction dispute indicates that an entity disputes authorization of the first transaction;

obtaining from a node of a plurality of nodes of a distributed blockchain system, by the at least one processor, a local copy of a distributed blockchain that comprises automated clearing house (ACH) authorization data associated with one or more prior transactions;

retrieving, by the at least one processor, a first ACH authorization of the ACH authorization data associated with the first transaction from the local copy of the distributed blockchain to initiate a dispute resolution process based on the transaction dispute, wherein the first ACH authorization is associated with the first transaction and the first ACH authorization was broadcast to the plurality of nodes of the distributed blockchain from a first computing device, wherein the first ACH authorization of the ACH authorization data associated with the first transaction is encrypted based on a public-private key pair comprising a private key associated with the first computing device and a public key associated with a second computing device, and wherein the ACH authorization data associated with the first transaction includes a digital signature and index/trace information associated with the first transaction;

validating, by the at least one processor, the first ACH authorization to generate validation information by generating a digest value corresponding to the ACH authorization data, generating a challenge value using the digest value corresponding to the ACH authorization data, applying a proof of work protocol to the digest value to obtain a proof of work value using the challenge value, and combining the challenge value with the proof of work value to provide a predefined requirement of the proof of work protocol, wherein the proof of work value satisfies the predefined requirement of the proof of work protocol, wherein generating the digest value comprises applying a hash function to the ACH authorization data and one or more blocks of the local blockchain;

verifying, by the at least one processor, the first transaction based on the validation information from the first ACH authorization to provide an authentication of the first transaction;

after the verification of the first transaction, updating the local copy of the distributed blockchain with the validation information; and after the verification of the first transaction, broadcasting the validation information to the plurality of nodes.

7. The system of claim 6, wherein obtaining the local copy of the distributed blockchain comprises obtaining new blocks of the distributed blockchain from one or more nodes in the plurality of nodes.

8. The system of claim 6, wherein obtaining the local copy of the distributed blockchain comprises requesting, by the processor, one or more prior transactions broadcast to the distributed blockchain by the first computing device.

9. The system of claim 6, wherein the index/trace information included in the ACH authorization data associated with the first transaction comprises one or more of an account holder name, a routing/transit number of an account, a time stamp of when the first transaction occurred, a time stamp of when the account was generated, and a time stamp of when the first ACH authorization was issued.

10. The system of claim 6, wherein the operations are performed using multitasking or parallel processing.

11. A non-transitory computer readable medium storing instructions that, when executed by at least one processor, cause the at least one processor to perform operations comprising:

receiving, by the at least one processor, transaction dispute data relating to a first transaction, wherein the first transaction was issued by an entity, and wherein the transaction dispute data indicates that the entity disputes authorization of the first transaction;

requesting from a node of a plurality of nodes of a distributed blockchain, by the at least one processor, a portion of the distributed blockchain to initiate a dispute resolution process based on the transaction dispute data, wherein the portion of the distributed blockchain comprises automated clearing house (ACH) authorization data associated with the first transaction;

receiving, by the at least one processor, the ACH authorization data associated with the first transaction, wherein the ACH authorization data associated with the first transaction was broadcast to the plurality of nodes from a first computing device associated with the entity, wherein the ACH authorization data associated with the first transaction is encrypted based on a public-private key pair comprising a private key associated with the first computing device and a public key associated with a second computing device, and wherein the ACH authorization data associated with the first transaction includes a digital signature and index/trace information associated with the first transaction;

validating, by the at least one processor, the ACH authorization data associated with the first transaction to generate validation information corresponding to the first ACH authorization data associated with the first transaction, wherein validating the ACH authorization data comprises generating a digest value corresponding to the ACH authorization data, generating a challenge value using the digest value corresponding to the ACH authorization data, applying a proof of work protocol to the digest value to obtain a proof of work value using the challenge value, and combining the challenge value with the proof of work value to provide a predefined requirement of the proof of work protocol, wherein the proof of work value satisfies the predefined requirement of the proof of work protocol, wherein generating the digest value comprises applying a hash function to the ACH authorization data and one or more blocks of the local blockchain; and verifying, by the at least one processor, the first transaction based on the ACH authorization data to provide an authentication of the first transaction.

12. The non-transitory computer readable medium of claim 11, wherein requesting the portion of the distributed blockchain comprises obtaining, from one or more nodes in the plurality of nodes, a local copy of the distributed blockchain.

13. The non-transitory computer readable medium of claim 11, wherein requesting the portion of the distributed blockchain comprises requesting from the first computing device, by the processor, an address for a block of the distributed blockchain that comprises the ACH authorization data.

14. The non-transitory computer readable medium of claim 11, wherein the index/trace information included in the ACH authorization data associated with the first transaction comprises one or more of an account holder name, a routing/transit number of an account, a time stamp of when the first transaction occurred, a time stamp of when the account was generated, and a time stamp of when the ACH authorization data was generated.

15. The non-transitory computer readable medium of claim 11, wherein the operations are performed using multitasking or parallel processing.

* * * * *